(12) United States Patent
Shin et al.

(10) Patent No.: US 12,192,172 B2
(45) Date of Patent: Jan. 7, 2025

(54) HARDWARE-BASED RELIABLE AND SECURE CONTAINER NETWORK

(71) Applicants: S2W INC., Seongnam-si (KR); KOREA ADVANCED INSTITUTE OF SCIENCE AND TECHNOLOGY, Daejeon (KR)

(72) Inventors: Seung Won Shin, Daejeon (KR); Myoung Sung You, Daejeon (KR); Sang Duk Suh, Seongnam-si (KR); Chang Hoon Yoon, Seongnam-si (KR); Seung Hyeon Lee, Hwaseong-si (KR)

(73) Assignees: S2W INC., Seongnam-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 230 days.

(21) Appl. No.: 17/860,478

(22) Filed: Jul. 8, 2022

(65) Prior Publication Data

US 2023/0239271 A1   Jul. 27, 2023

(30) Foreign Application Priority Data

Jan. 24, 2022 (KR) .................. 10-2022-0010031

(51) Int. Cl.
*H04L 9/40* (2022.01)
*H04L 61/00* (2022.01)

(52) U.S. Cl.
CPC .......... *H04L 63/0236* (2013.01); *H04L 61/35* (2013.01); *H04L 63/126* (2013.01)

(58) Field of Classification Search
CPC ... H04L 63/0236; H04L 61/35; H04L 63/126; H04L 61/2525
See application file for complete search history.

(56) References Cited

U.S. PATENT DOCUMENTS

| | | | |
|---|---|---|---|
| 2007/0208873 A1* | 9/2007 | Lu ..................... | G06F 21/74 709/238 |
| 2008/0155661 A1* | 6/2008 | Arashin .............. | H04L 63/08 726/4 |

(Continued)

FOREIGN PATENT DOCUMENTS

KR   10-2021-0087399 A   7/2021

OTHER PUBLICATIONS

Myoungsung You, et al., "eBPF/XDP-based high-performance packet payload inspection system for container environments", pp. 1-5, Nov. 5, 2021.

*Primary Examiner* — Amie C. Lin
(74) *Attorney, Agent, or Firm* — Sughrue Mion, PLLC

(57) ABSTRACT

A method for securing network communication between containers by a terminal, includes: a step of installing an HSI (Hyperion Secure Interface) for communication with a secure bridge included in an NIC (Network Interface Chip) in a secure container through a manager module; a step of changing a source address of a transmission packet to a specific token on the basis of a map of the HSI through the manager module; a step of delivering the transmission packet to the secure bridge through the HSI; a step of determining whether the specific token of the transmission packet is valid; and a step of changing the specific token to the source address and delivering the transmission packet to a target container when the specific token is valid.

9 Claims, 9 Drawing Sheets

(56) References Cited

U.S. PATENT DOCUMENTS

| | | | |
|---|---|---|---|
| 2012/0131225 A1* | 5/2012 | Chiueh | H04L 12/4633 |
| | | | 718/1 |
| 2013/0345530 A1 | 12/2013 | McRoberts et al. | |
| 2015/0156102 A1* | 6/2015 | Szabo | H04L 43/50 |
| | | | 709/224 |
| 2022/0217120 A1* | 7/2022 | Flavel | H04L 63/0263 |
| 2022/0417219 A1* | 12/2022 | Sheriff | H04L 67/56 |
| 2023/0131043 A1* | 4/2023 | Bouchard | H04L 45/021 |
| | | | 370/390 |

* cited by examiner

HARDWARE-BASED RELIABLE AND SECURE CONTAINER NETWORK

TECHNICAL FIELD

The present specification relates to a method of operating a hardware-based reliable and secure container network in a cloud environment, and an apparatus for the method.

BACKGROUND ART

A Linux container is an OS-level virtualization technology, and means a set of processes (e.g., process, file system, network) isolated from the rest of a system. A host kernel can be shared and used by all containers, and the container is characterized by being lighter than the existing hardware-level virtualization machine (VM). Currently, most cloud services are operating in a container environment. For example, such cloud services may be operated in the form of a micro service architecture, and each micro service may be executed in a container.

An eBPF is a virtual machine in a Linux kernel developed for a network packet processing. A program written in eBPF byte codes can operate at high speed in a kernel area.

An XDP means a network hook in a Linux kernel in which an eBPF program can be registered and executed. The registered program can operate at high speed in a device driver level, and can process a packet before sk buff allocation. Through this, it is possible to process a packet before a kernel network stack.

As container technology emerges as a substantial standard of virtualization technology for micro-service operation in today's cloud environment, container network security has become a crucial factor in safe cloud service operation.

SUMMARY OF INVENTION

Technical Problem

An object of the present specification is to provide a security method for protecting containers from a container hijacked by an attacker or from network attack performed by a processor in a host system.

Technical problems to be achieved by the present specification are not limited to the technical problems mentioned above, and other technical problems not mentioned may be clearly understood by those of ordinary skill in the art to which the present specification belongs from detailed description of the following specification.

Solution to Problem

According to an aspect of the present specification, there is provided a method for securing network between containers by a terminal, comprising: a step of installing an HSI (Hyperion Secure Interface) for communication with a secure bridge included in an NIC (Network Interface Chip) in a secure container through a manager module; a step of changing a source address of a transmission packet to a specific token on the basis of a map of the HSI through the manager module; a step of delivering the transmission packet to the secure bridge through the HSI; a step of determining whether the specific token of the transmission packet is valid; and a step of changing the specific token to the source address and delivering the transmission packet to a target container when the specific token is valid.

In addition, the method may further comprise a step of dropping the transmission packet when the specific token is not valid.

In addition, the method may further comprise a step of verifying network context of the transmission packet on the basis of preset security policy corresponding to the source address.

In addition, the method may further comprise a step of receiving policy related to the secure container from a user; a step of extracting string patterns to be inspected for each secure container on the basis of the policy; a step of generating a deterministic finite automaton (DFA) for inspecting the extracted string patterns on the basis of the extracted string patterns; and a step of converting and storing a state transition table of the deterministic finite automaton into a match-action table.

In addition, the method may further comprise a step of extracting payload from the transmission packet; and a step of acquiring the state transition table and inspecting a pattern related to the state transition table in the payload.

In addition, the method may further comprise a step of delivering the transmission packet to the target container when the pattern of the payload matches on the basis of the state transition table.

According to another aspect of the present specification, there is provided a system which secures network between containers, comprising: a manager module which installs an HSI (Hyperion Secure Interface) for communication with a secure bridge included in an NIC (Network Interface Chip) in a secure container, changes a source address of a transmission packet to a specific token on the basis of a map of the HSI, and delivers the transmission packet to the secure bridge through the HSI; and a secure bridge which determines whether the specific token of the transmission packet is valid, and changes the specific token to the source address and delivers the transmission packet to a target container when the specific token is valid.

In addition, another aspect of the present specification, there is provided a terminal which secures network between containers, including: a communication module; a memory; and a processor which functionally controls the communication module and the memory, wherein the processor installs an HSI (Hyperion Secure Interface) for communication with a secure bridge included in an NIC (Network Interface Chip) in a secure container through a manager module, changes a source address of a transmission packet to a specific token on the basis of a map of the HSI through the manager module, delivers the transmission packet to the secure bridge through the HSI, determines whether the specific token of the transmission packet is valid, and changes the specific token to the source address and delivers the transmission packet to a target container when the specific token is valid.

Advantageous Effects of Invention

According to an embodiment of the present specification, it is possible to protect containers from a container hijacked by an attacker or from network attack performed by a processor in a host system, without compromising network performance.

Effects obtainable in the specification are not limited to the effects mentioned above, and other effects not mentioned will be clearly understood by those of ordinary skill in the art to which the present specification belongs from the description below.

Figure 1:
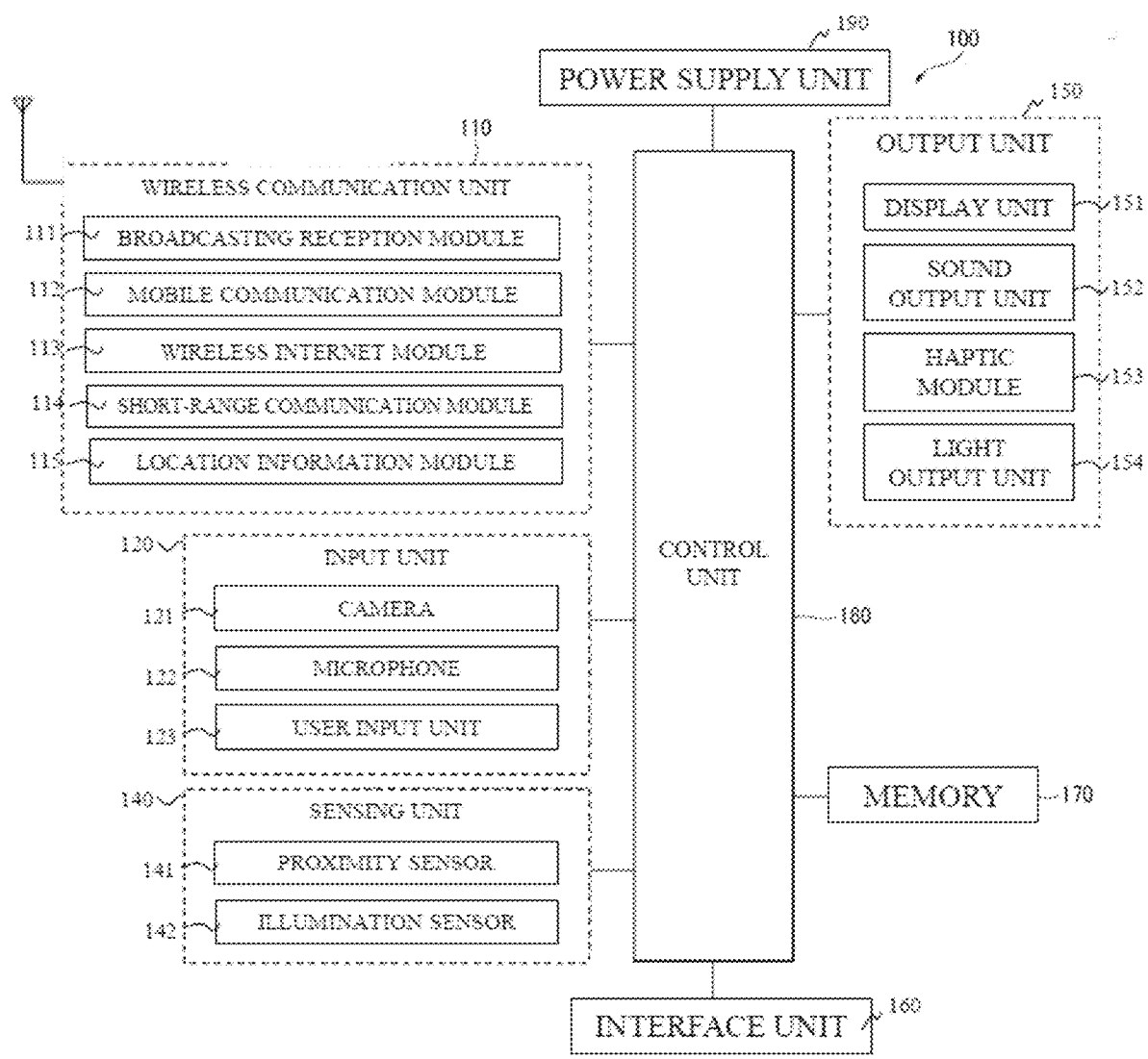
FIG. 1 is a block diagram illustrating an electronic apparatus related to the present specification.

The accompanying drawings, which are included as a part of the detailed description to help the understanding of the present specification, provide embodiments of the present specification, and together with the detailed description, explain the technical features of the present specification.

DESCRIPTION OF EMBODIMENTS

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical idea disclosed in the present specification is not limited by the accompanying drawings, and should be understood to include all changes, equivalents, or substitutes included in the spirit and scope of the present specification.

Terms including an ordinal number, such as first, second, etc., may be used to describe various components, but the components are not limited by the terms. The above terms are used only for the purpose of distinguishing one component from another.

When a certain component is referred to as being "connected" or "linked" to another component, it may be directly connected or linked to the other component, but it should be understood that other components may exist in between. On the other hand, when it is mentioned that a certain component is "directly connected" or "directly linked" to another component, it should be understood that no other component exists in between.

The singular expression includes the plural expression unless the context clearly dictates otherwise.

In the present application, terms such as "include" or "have" are intended to designate that the features, numbers, steps, operations, components, parts, or combinations thereof described in the specification exist, but it should be understood that the possibility of presence or addition of one or more other features, numbers, steps, operations, components, parts, or combinations thereof is not excluded.

FIG. 1 is a block diagram illustrating an electronic apparatus according to the present specification.

The electronic apparatus 100 may include a wireless communication unit 110, an input unit 120, a sensing unit 140, an output unit 150, an interface unit 160, a memory 170, a control unit 180, a power supply unit 190, and the like. The components illustrated in FIG. 1 are not essential in implementing the electronic apparatus, and the electronic apparatus described in the present specification may have more or fewer components than the components listed above.

More specifically, the wireless communication unit 110 of the components may include one or more modules which enable wireless communication between the electronic apparatus 100 and a wireless communication system, between the electronic apparatus 100 and another electronic apparatus 100, or between the electronic apparatus 100 and an external server. In addition, the wireless communication unit 110 may include one or more modules which connect the electronic apparatus 100 to one or more networks.

Such a wireless communication unit 110 may include at least one of a broadcasting reception module 111, a mobile communication module 112, a wireless internet module 113, a short-range communication module 114, and a location information module 115.

The input unit 120 may include a camera 121 or an image input unit for inputting an image signal, a microphone 122 or an audio input unit for inputting an audio signal, and a user input unit 123 (e.g., touch key, push key (mechanical key), etc.) for receiving information from a user. Voice data or image data collected by the input unit 120 may be analyzed and processed by a control command of a user.

The sensing unit 140 may include one or more sensors for sensing at least one of information in the electronic apparatus, surrounding environment information around the electronic apparatus, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared sensor (IR sensor), a finger scan sensor, an ultrasonic sensor, an optical sensor (e.g., camera 121), a microphone 122, a battery gauge, an environment sensor (e.g., barometer, hygrometer, thermometer, radiation detection sensor, heat detection sensor, and gas detection sensor), and a chemical sensor (e.g., electronic nose, healthcare sensor, and biometric sensor). Meanwhile, the electronic apparatus disclosed in the present may utilize combination of information sensed by at least two sensors of such sensors.

The output unit 150 is to generate an output related to sight, hearing, touch, or the like, and may include at least one of a display unit 151, a sound output unit 152, a haptic module 153, and a light output unit. The display unit 151 has an inter-layer structure with a touch sensor or is formed integrally, thereby implementing a touch screen. Such a touch screen may serve as a user input unit 123 providing an input interface between the electronic apparatus 100 and a user, and may provide an output interface between the electronic apparatus 100 and the user.

The interface unit 160 serves as a passage with various kinds of external apparatus connected to the electronic apparatus 100. Such an interface unit 160 may include at least one of a wired/wireless headset port, an external charger port, a wired/wireless data port, a memory card port, a port connecting a device provided with an identification module, an audio I/O (Input/Output) port, a video I/O (Input/Output) port, and an earphone port. The electronic apparatus 100 may perform a proper control related to a connected external apparatus in response to connecting an external apparatus to the interface unit 160.

In addition, the memory 170 stores data supporting various functions of the electronic apparatus 100. The memory 170 may store a number of application programs (or application) running in the electronic apparatus 100, data for operation of the electronic apparatus 100, and commands. At least a part of such application programs may be downloaded from an external server through wireless communication. In addition, at least a part of such application programs may exist on the electronic apparatus 100 from the time of shipment for basic functions (e.g., call receiving and sending functions, and message receiving and sending functions) of the electronic apparatus 100. Meanwhile, the application programs may be stored in the memory 170, installed on the electronic apparatus 100, and driven to perform operations (or functions) of the electronic apparatus by the control unit 180.

In addition to the operations related to the application programs, the control unit 180 generally controls overall operations of the electronic apparatus 100. The control unit 180 may provide or process appropriate information or functions to a user by processing signals, data, information, and the like input or output through the components described above or running the application programs stored in the memory 170.

In addition, the control unit 180 may control at least a part of the components described with reference to FIG. 1 to run the application programs stored in the memory 170. Furthermore, in order to run the application programs, the control unit 180 may operate at least two components included in the electronic apparatus 100 in combination with each other.

The power supply unit 190 receives external power and internal power, and supplies power to each component included in the electronic apparatus 100 under the control of the control unit 180. Such a power supply unit 190 may include a battery, and the battery may be a built-in battery or a replaceable battery.

At least a part of the components may be operated cooperatively with each other to implement an operation, control, or control method of the electronic apparatus according to various embodiments described hereinafter. In addition, the operation, control, or control method of the electronic apparatus may be implemented on the electronic apparatus by running at least one application program stored in the memory 170.

In the present specification, the electronic apparatus 100 may be collectively referred to as a terminal.

A container is a lightweight alternative of virtual machine (VM) technology, and is actively used for micro-service architecture in the latest cloud environment since it is superior to existing VMs in terms of application deployment and resource utilization. For example, major public cloud service providers such as Amazon Web service, Google Cloud Platform, and Microsoft Azure are also for cloud aggressively adopting container technology hosting services.

Such aggressive adoption has also increased security threats to the overall aspect of container technology. Generally, all containers executed in a host may share the same system resources (kernel and the like). Accordingly, a small security flaw in a container platform may seriously affect a cloud environment as well as a host system.

Current container platforms provide network access control for containers with IP addresses assigned to each container, but there are still serious vulnerabilities in this method. In particular, containers widely used as entry points for container services, such as HAProxy and OpenVPN, share a network namespace with a host for high-performance networking and directly expose services to external networks. These are called network permission containers and are a new security threat to container networks. For example, an attacker may hijack a network permission container through a known vulnerability, and exploit it to launch a network-based attack on another container.

Figure 2:
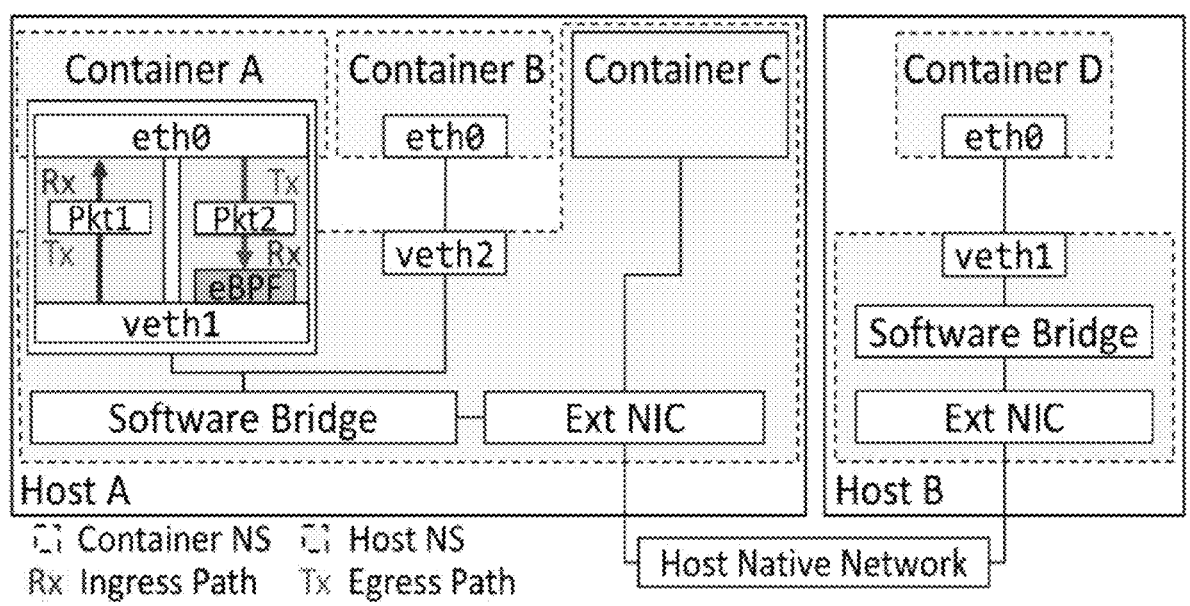
FIG. 2 is a diagram illustrating an example of a container networking model according to the present specification.

FIG. 2 is a diagram illustrating an example of a container networking model according to the present specification.

Referring to FIG. 2, containers share the same Linux kernel in host system, but may be logically separated and executed through Linux namespace technology. For example, each container may have an independent network namespace, which may include a network device (eth0), a routing table, and the like. A container platform such as Docker may make a virtual device (veth1) paired to a network device in each container in a host network namespace to connect such containers through a network, and may connect them by software bridge. When a container communicates with another container of a different node, a packet may be encapsulated and delivered through an overlay network.

Differently from a general container, there may be a container (Container C) which directly uses a network namespace of a host system. In the present specification, this is referred to as a host network container. These may share the network namespace with the host system for high speed networking, and expose a service to an external network.

In the present specification, it may be assumed that containers executed in a container platform are not trusted, and an attacker may hijack an externally accessible container through a known vulnerability. In addition, it may be assumed that the attacker aims to exploit the hijacked container to further hijack another container.

In the event of a network attack (e.g., ARP spoofing, packet sniffing such as TCP packet injection, and attack using packet injection) performed by a process within the host system or the container hijacked by the attacker, security technology to protect other containers is required.

Most current container network security solutions rely on packet filtering to restrict container network access. However, current container network security solutions operating based on software may not completely protect against network attacks performed on the host side.

For example, even if Cilium is expanded to filter packets on both TC ingress and egress paths of a virtual device, it is difficult to prevent an attacker from accessing the virtual device. In addition, since the attacker may inject an arbitrary packet, it is difficult to distinguish between a normal packet and an attacker-injected packet in the egress path. Even if all packets are encrypted with mTLS like Istio, only the TCP packets can be protected, which will cause a great performance degradation. In addition, since these are all implemented in software, there may be an additional vulnerability that an attacker may exploit.

Figure 3:
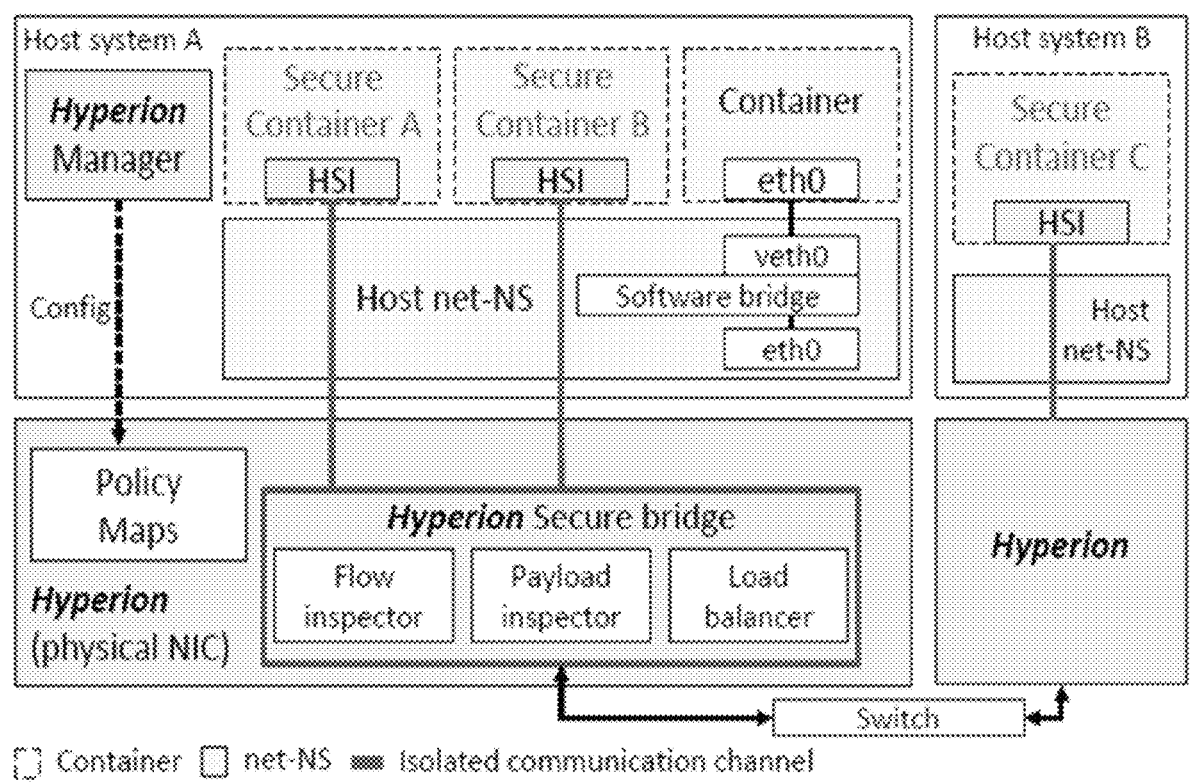
FIG. 3 is a diagram illustrating an example of a hardware-based security system according to the present specification.

FIG. 3 is a diagram illustrating an example of a hardware-based security system according to the present specification.

Referring to FIG. 3, a Hyperion security system may include a physical NIC (Network Interface Card), provide physically isolated communication channels to a container, and control network access between containers without network performance degradation through a hardware acceleration packet inspector.

The Hyperion security system includes a manager module which manages a TCN (Trusted Container Network) according to network security policy designated by a manager, a Hyperion secure bridge which is located in the physical NIC and performs network access control for the TCN, and an HSI (Hyperion Secure Interface) installed in each secure container.

All communication between secure containers may be managed through a Hyperion security inspector (Blue Box) which is not an existing bridge network.

The Hyperion may provide physically isolated communication channels to the connected containers to prevent their communication from being exposed to a host network namespace. In addition, the secure bridge may inspect a received packet at high speed using a hardware-based packet inspector to prevent a network attack between containers within the isolated channels.

Figure 4:
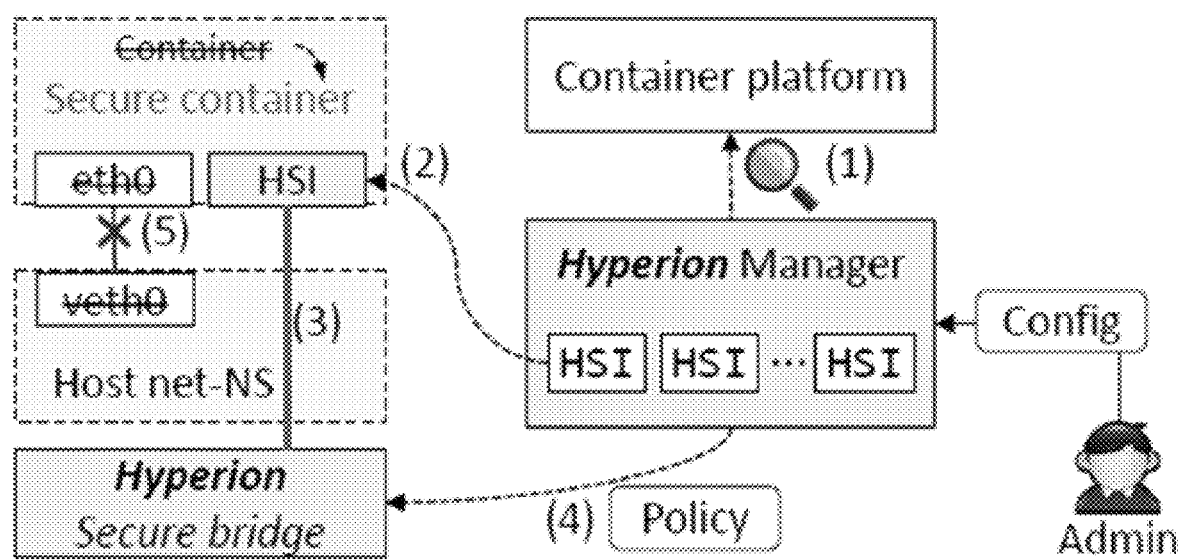
FIG. 4 is a diagram illustrating an example of an HSI installation method according to the present specification.

FIG. 4 is a diagram illustrating an HSI installation method according to the present specification.

The manager module may perform HSI management and security policy management.

Referring to FIG. 4, the HSI (Hyperion Secure Interface) is a network interface used by the secure container connected to the Hyperion, through which the secure container may exchange a packet with the secure bridge located in the NIC without passing through a host net-NS (NameSpace).

(1) The manager module may create an HSI for a new container whenever the new container is detected as a 'secure container' tag.

(2) The manager module may install a new HSI having a security engine built therein, in a container.

(3) The manager module may set an IP address assigned to a container to a new HSI.

(4) The manager module may update security policy corresponding to a container, with a Policy map of the Hyperion bridge. Through this, a new secure container may communicate with another secure container through the Hyperion.

(5) The manager module may inactivate all interfaces on the host side to completely separate a secure container from a bridge network. If the secure container is removed, the manager module may withdraw the HSI.

Figure 5:
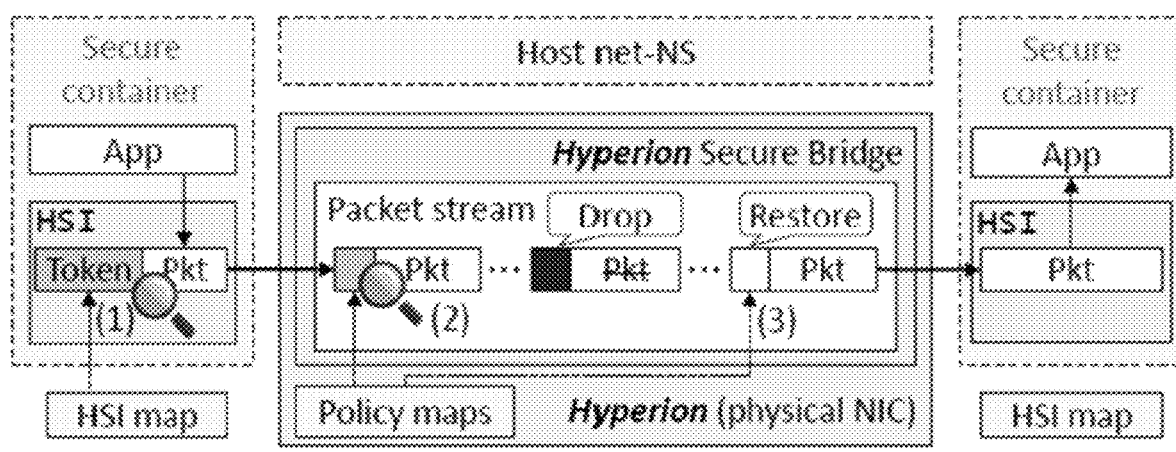
FIG. 5 is a diagram illustrating an example of packet flow between secure containers according to the present specification.

FIG. 5 is a diagram illustrating packet flow between secure containers according to the present specification. Referring to FIG. 5, the packet between the secure containers may go through the next three steps.

(1) Source signing: The Hyperion may protect the secure container from packet spoofing attack by implementing a source signing algorithm in the HSI. The source signing aims to check whether all packets delivered to the secure container are generated in a verified source (e.g., another secure container).

The Hyperion may check whether a transmission packet is spoofed in the HSI of the source container. For example, when the packet is not spoofed, it is possible to change source MAC and IP address (e.g., 48+32 bits) of the transmission packet to a temporary 80-bit token stored in the HSI of the secure container.

The manager module may hash an ID and timestamp of the secure container to issue a new token, and update it to the HSI map of the secure container. In addition, the manager module may periodically revoke existing tokens and issue new tokens to prevent tokens from being reused. Finally, the packet is delivered to the secure bridge.

(2) Packet inspection: When the packet arrives at the secure bridge, the Hyperion may check whether the built-in token is valid. When the token is invalid, it may mean that the packet has been spoofed. Accordingly, the Hyperion may immediately delete the packet. In addition, when the packet does not match the network policy, the Hyperion may delete the packet.

(3) Network context restoration: When the packet is valid, the Hyperion may restore the token of the packet to the source MAC and IP address of the start container, and deliver them to a target container.

Figure 6:
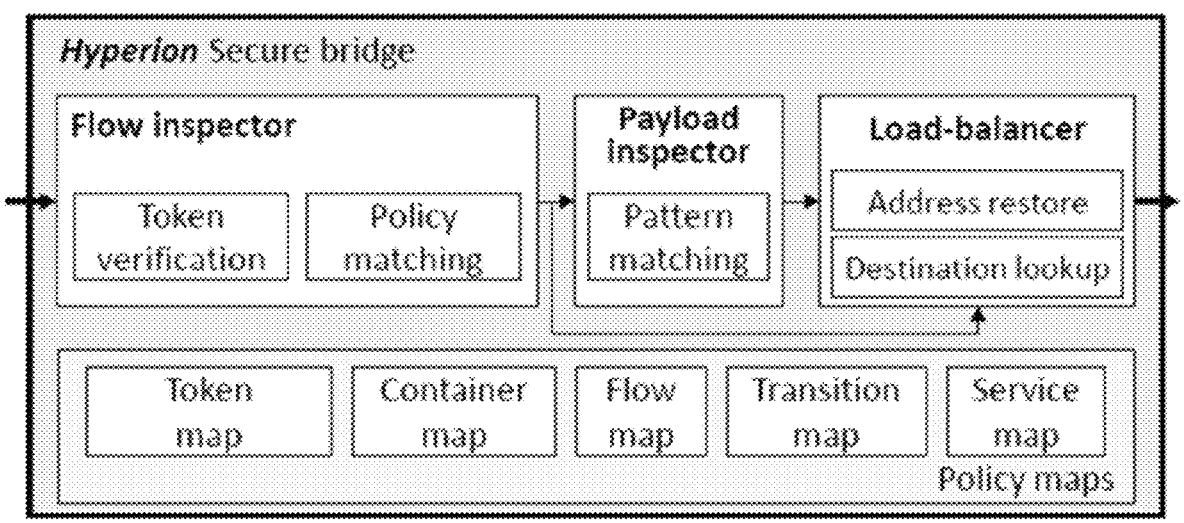
FIG. 6 is a diagram illustrating an embodiment of a secure bridge according to the present specification.

FIG. 6 is a diagram illustrating an embodiment of a secure bridge according to the present specification.

The Hyperion enables the physically isolated communication channels between the secure container using the HSI and the secure containers using the secure bridge to remove an attack vector of the host system.

Referring to FIG. 6, the flow inspector aims to check reliability of an incoming packet and restrict reachability between the secure containers. For this, it is possible to check whether the incoming (ARP and IP) packet is directed to the secure container.

Figure 7:
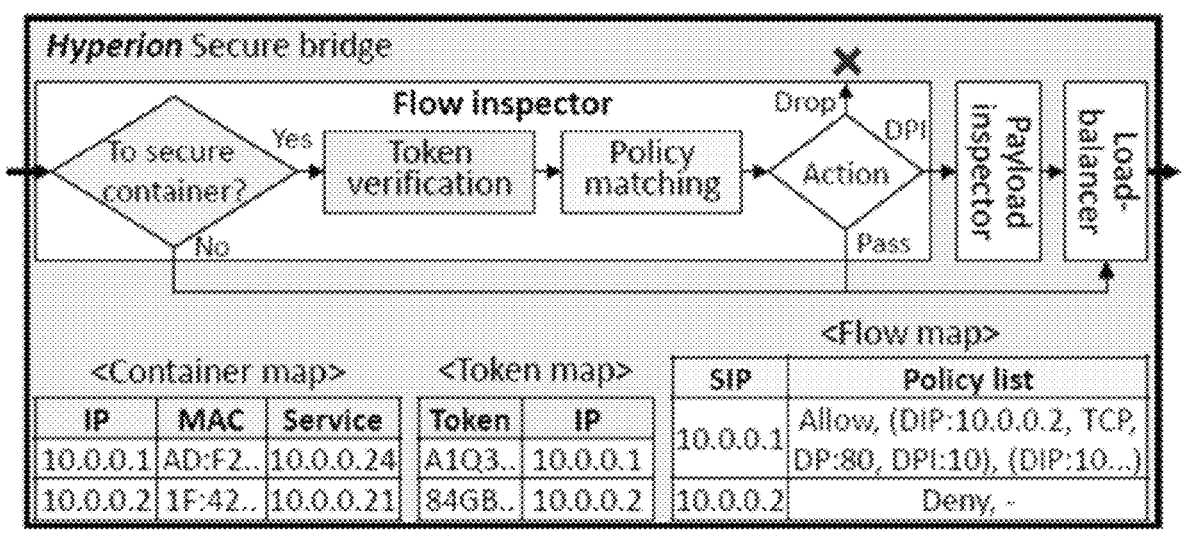
FIG. 7 is a diagram illustrating an example of flow inspection of a secure bridge according to the present specification.

FIG. 7 is a diagram illustrating flow inspection of a secure bridge according to the present specification.

Referring to FIG. 7, a packet inspection procedure may be performed in a physical NIC by using match action tables.

A container which is not connected to the Hyperion cannot perform network attack on the secure container, but network attack between the same secure containers may be possible. In order to prevent the attack, the secure bridge controls network access between secure containers in accordance with the network policy by using the flow inspector and the payload inspector.

The flow inspector may verify the token of the received packet, and inspect violations of network policy, for example, from Layer 2 to Layer 4. For example, the flow inspector may inspect a header part of the packet. The flow inspector may inquire the token map kept up to data to check a token stored in each packet. When the inquiry fails, the packet may be immediately deleted.

When the token is checked, the flow inspector may bring a security policy list for the source IP address of the packet from the flow map, and compare the network context of the packet with each policy configured with a target IP address, a policy restriction condition (e.g., protocol, port number, or DPI displayer), and an action. If the packet does not match the policy, the packet may be discarded.

A basic action is "Allow", but a network manager may set both of the basic action and an action for each policy ("Allow" or "Deny"). If the policy includes a DPI indicator, the packet may be delivered to the payload inspector for additional inspection.

When the additional inspection for the received packet is unnecessary, the packet is delivered to a load-balancer. The load-balancer may restore the token of the packet to the original address, and deliver the packet to a destination. Since all of such modules are implemented in hardware, the module may operate at high speed.

Figure 8:
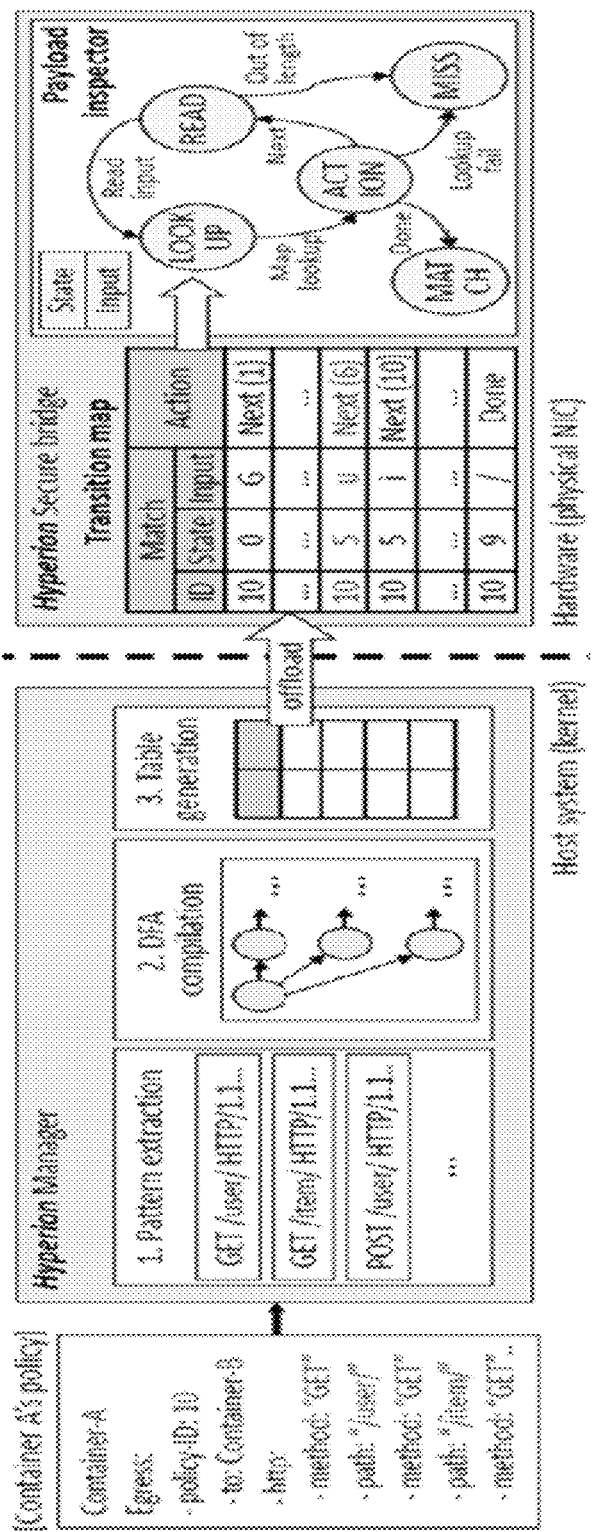
FIG. 8 is a diagram illustrating an embodiment of payload inspection of a secure bridge and pattern compilation of a manager module according to the present specification.

FIG. 8 is a diagram illustrating an embodiment of payload inspection of a secure bridge and pattern compilation of a manager module according to the present specification.

The Hyperion may provide a payload inspector fully-offloaded from the secure bridge to secondary security inspection. The manager module may inspect various pre-defined payloads of L7 protocol (e.g., HTTP) to meet network security requirements.

Referring to FIG. 8, when a user sets security policy about a secure container, the Hyperion manager module may parse the security policy. For example, the manager module may extract strings (e.g., 'GET', '/user/') to be inspected in the payload of a packet in accordance with the policy. Then, the strings extracted in accordance with a given L7 protocol structure (e.g., HTTP) may be combined to create detection patterns (e.g., 'GET/user/HTTP/').

Thereafter, a deterministic finite automaton (DFA) capable of detecting the detection patterns may be created. For example, the DFA capable of identifying common prefixes of the detection patterns may be compiled. Thereafter, a state transition table of the created automaton may be converted into a match-action table format utilized in general network packet processing, be assigned for each container, and be stored in the secure bridge.

The payload inspector may first analyze a header part of the packet transmitted from the container to extract only the payload part. Thereafter, the payload inspector may get the state transition table of the automaton assigned for each container, read the payload byte by byte based thereon, and transit the state of the automaton, thereby inspecting whether patterns appear.

Figure 9:
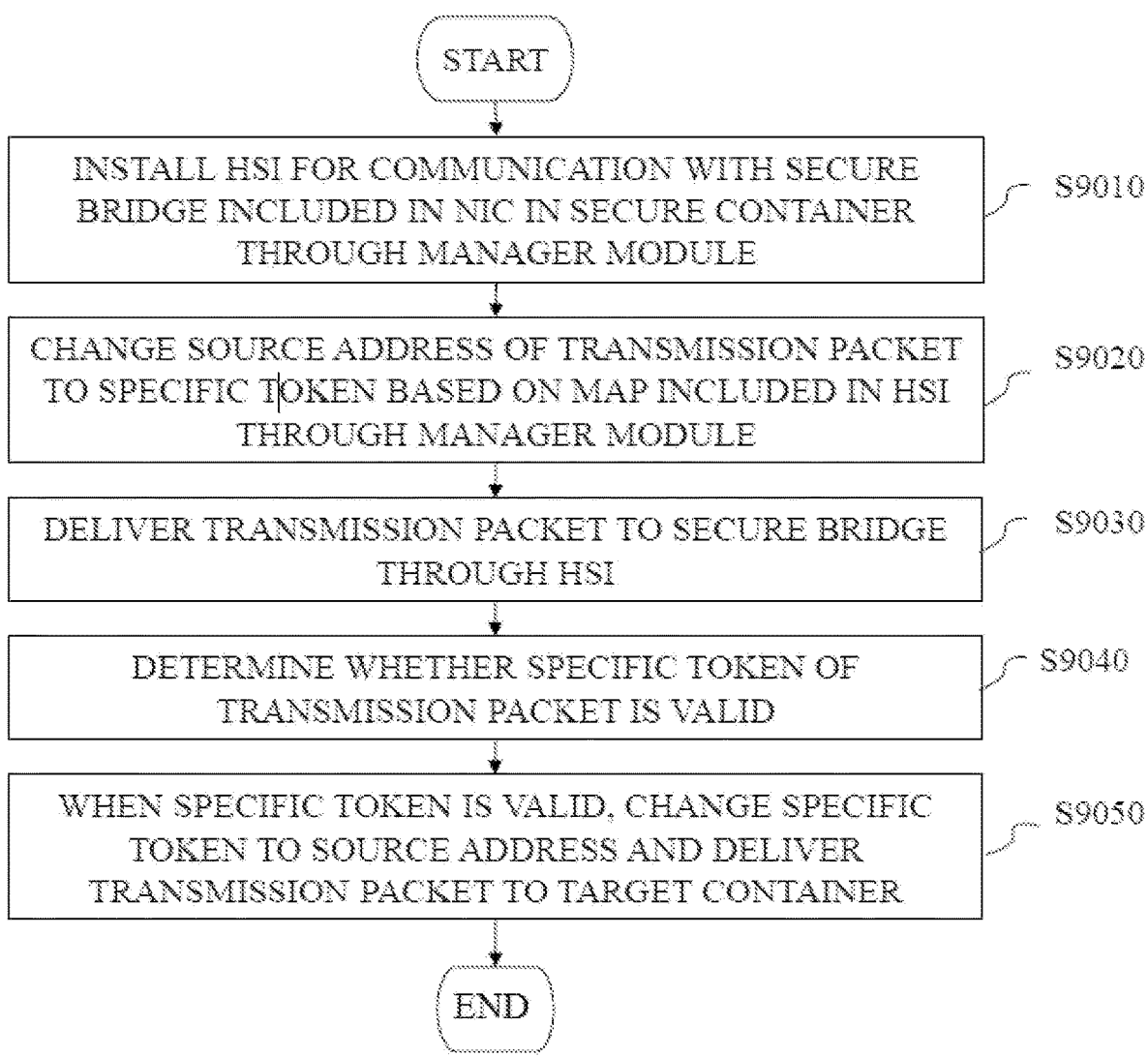
FIG. 9 is a diagram illustrating an embodiment of a terminal according to the present specification.

FIG. 9 is a diagram illustrating an embodiment according to the present specification.

Referring to FIG. 9, a terminal may include the above-described Hyperion security system.

The terminal installs an HSI for communication with a secure bridge included in an NIC in a secure container through a manager module (S9010).

The terminal changes a source address of a transmission packet to a specific token on the basis of a map included in the HSI through the manager module (S9020).

The terminal delivers the transmission packet to the secure bridge through the HSI (S9030).

The terminal determines whether a specific token of the transmission packet is valid (S9040).

When the specific token is valid, the specific token is changed to a source address, and the transmission packet is delivered to a target container (S9050). If the specific token is invalid, the terminal may determine that the source address of the transmission packet has been spoofed and drop the transmission packet.

If the network policy is related to a blacklist, the terminal may drop the packet when the pattern matches.

The terminal may verify network context of the transmission packet on the basis of the security policy corresponding to the source address.

In addition, the terminal may receive policy related to the secure container from a user, extract string patterns to be inspected for each secure container on the basis of the policy, and create deterministic finite automaton (DFA) for inspecting the extracted string patterns.

Thereafter, the terminal may convert and store a state transition table of the deterministic finite automaton into a match-action table.

The terminal may extract payload from the transmission packet, acquire the state transition table from the stored match-action table, and inspect a pattern related to the state transition table in the payload.

The terminal may deliver the transmission packet to a target container when the pattern of the payload matches on the basis of the state transition table.

The above-described present specification may be implemented as a computer-readable code on a program-recorded medium. The computer-readable medium includes all kinds of recording devices which store data readable by a computer system. Examples of the computer-readable medium are an HDD (Hard Disk Drive), an SSD (Solid State Disk), an SDD (Silicon Disk Drive), a ROM, a RAM, a CD-ROM, a magnetic tape, a floppy disk, an optical data storage device, and the like, and also include what is implemented in a form of carrier wave (e.g., transmission through the Internet). Accordingly, the above detailed description should not be construed as restrictive in all respects and should be considered as exemplary. The scope of the present specification should e determined by a reasonable interpretation of the claims, and appended all modifications within the equivalent scope of the present specification are included in the scope of the present specification.

In addition, although the above description has been focused on services and embodiments, this is merely an example and does not limit the present specification, and those of ordinary skill in the art can know that various modifications and application not exemplified in the above description are possible in the scope not depart from the essential characteristics of the present service and embodiments. For example, each component specifically represented in the embodiments may be modified and implemented. In addition, differences related to such modifications and applications should be construed as being included in the scope of the present specification defined in the appended claims.

The invention claimed is:

1. A security method for securing network communication between containers by a terminal, the security method comprising:
a step of installing, in a first secure container in a host system, a Hyperion Secure Interface (HSI) for communication with a secure bridge included in a Network Interface Chip (NIC) through a manager module;
a step of changing a source address of a transmission packet to a specific token based on a map of the HSI through the manager module;
a step of delivering the transmission packet to the secure bridge included in the NIC through the HSI;
a step of determining whether the specific token of the transmission packet is valid; and
a step of changing the specific token to the source address and delivering the transmission packet to a target container when the specific token is valid,
wherein the target container is a second secure container included in the host system,
wherein the host system includes a host network container that directly uses a host network namespace of the host system, and
wherein the secure bridge is configured to provide physically isolated communication channels to the first secure container and the second secure container to prevent communication between the secure bridge and each of the first secure container and the second secure container from being exposed to the host network namespace.

2. The security method according to claim 1, further comprising a step of dropping the transmission packet when the specific token is not valid.

3. The security method according to claim 1, further comprising a step of verifying network context of the transmission packet based on preset security policy corresponding to the source address.

4. The security method according to claim 3, further comprising:
- a step of receiving policy related to the first secure container from a user;
- a step of extracting string patterns to be inspected for each secure container based on the policy related to the first secure container;
- a step of generating a deterministic finite automaton (DFA) for inspecting the extracted string patterns based on the extracted string patterns; and
- a step of converting and storing a state transition table of the deterministic finite automaton into a match-action table.

5. The security method according to claim 4, further comprising:
- a step of extracting payload from the transmission packet; and
- a step of acquiring the state transition table and inspecting a pattern related to the state transition table in the payload.

6. The security method according to claim 5, further comprising a step of delivering the transmission packet to the target container when the pattern of the payload matches based on the state transition table.

7. The security method according to claim 5, further comprising a step of dropping the transmission packet when the pattern of the payload matches based on the state transition table.

8. A security system which secures network communication between containers, the security system comprising:
- a host system including a manager module, a first secure container, a second secure container and a host network container that directly uses a host network namespace of the host system; and
- a Network Interface Chip (NIC) including a secure bridge,
- wherein the manager module is configured to install, in the first secure container of the host system, a Hyperion Secure Interface (HSI) for communication with the secure bridge included in the NIC change a source address of a transmission packet to a specific token based on a map of the HSI, and deliver the transmission packet to the secure bridge through the HSI; and
- wherein the secure bridge is configured to determine whether the specific token of the transmission packet is valid, change the specific token to the source address and deliver the transmission packet to a target container when the specific token is valid,
- wherein the target container is the second secure container included in the host system, and
- wherein the secure bridge is configured to provide physically isolated communication channels to the first secure container and the second secure container to prevent communication between the secure bridge and each of the first secure container and the second secure container from being exposed to the host network namespace.

9. A terminal which secures network communication between containers, the terminal comprising:
- a communication module;
- a memory; and
- a processor which functionally controls the communication module and the memory,
- wherein the processor is configured to:
- install, a first secure container in a host system, a Hyperion Secure Interface (HSI) for communication with a secure bridge included in a Network Interface Chip (NIC) through a manager module,
- change a source address of a transmission packet to a specific token on the basis of based on a map of the HSI through the manager module,
- deliver the transmission packet to the secure bridge through the HSI,
- determine whether the specific token of the transmission packet is valid, and
- change the specific token to the source address and deliver the transmission packet to a target container when the specific token is valid,
- wherein the target container is a second secure container included in the host system,
- wherein the host system includes a host network container that directly uses a host network namespace of the host system, and
- wherein the secure bridge is configured to provide physically isolated communication channels to the first secure container and the second secure container to prevent communication between the secure bridge and each of the first secure container and the second secure container from being exposed to the host network namespace.

* * * * *